(12) United States Patent
Khang (10) Patent No.: US 9,915,232 B2
(45) Date of Patent: Mar. 13, 2018

(54) THROTTLE BODY NECK FOR AN INTAKE MANIFOLD (71) Applicant: Lao Khang, Wisconsin Rapids, WI (US)

(72) Inventor: Lao Khang, Wisconsin Rapids, WI (US)

(*) Notice: Subject to any disclaimer, the term of this patent is extended or adjusted under 35 U.S.C. 154(b) by 211 days.

(21) Appl. No.: 15/051,506

(22) Filed: Feb. 23, 2016

(65) Prior Publication Data

US 2016/0245243 A1    Aug. 25, 2016

Related U.S. Application Data

(60) Provisional application No. 62/119,695, filed on Feb. 23, 2015.

(51) Int. Cl.
*F02M 35/10* (2006.01)
*F02B 27/00* (2006.01)
*F02M 35/108* (2006.01)

(52) U.S. Cl.
CPC ..... *F02M 35/10032* (2013.01); *F02B 27/005* (2013.01); *F02M 35/108* (2013.01); *F02M 35/10098* (2013.01); *F02M 35/10144* (2013.01); *Y02T 10/146* (2013.01)

(58) Field of Classification Search
CPC .......... F02M 35/10032; F02M 35/108; F02M 35/10098; F02M 35/10144; F02B 27/005; Y02T 10/146

USPC .................................................. 123/184.51
See application file for complete search history.

(56) References Cited

U.S. PATENT DOCUMENTS

| | | | | |
|---|---|---|---|---|
| 5,769,045 A * | 6/1998 | Edwards | ........... | F02M 35/10032 123/184.61 |
| 6,739,313 B2 * | 5/2004 | Watanabe | ............. | F02B 61/045 123/184.24 |
| 7,063,060 B2 * | 6/2006 | Daly | .................... | F02M 35/021 123/184.21 |
| 2005/0093396 A1 * | 5/2005 | Larson, III | ............. | H03H 9/132 310/320 |

* cited by examiner

*Primary Examiner* — Marguerite McMahon (57) ABSTRACT

A volumetric expander for increasing the air intake between a throttle body and an intake manifold includes a throttle body neck, a manifold adapter, and a throttle body adapter. The manifold adapter and the throttle body adapter are positioned opposite each other along a intake tube of the throttle body neck, wherein a first air channel traversing along the intake tube is aligned with a first intake opening of both the manifold adapter and the throttle body adapter. Additionally, a second air channel is aligned with a second intake opening of both the manifold adapter and the throttle body adapter. A manifold gasket is positioned into the manifold adapter and creates an air tight seal between the manifold adapter and the intake manifold, while a throttle body gasket is positioned into the throttle body adapter and creates an air tight seal between the throttle body adapter and the throttle body.

16 Claims, 7 Drawing Sheets

THROTTLE BODY NECK FOR AN INTAKE MANIFOLD

The current application claims a priority to the U.S. Provisional Patent application Ser. No. 62/119,695 filed on Feb. 23, 2015.

FIELD OF THE INVENTION

The present invention relates generally to an engine air intake. More specifically, the present invention is a throttle body neck to expand the volume of the plenum chamber in the intake manifold of the vehicle in order to gain horsepower and torque.

BACKGROUND OF THE INVENTION

Car modifications are commonly employed to increase the performance of a vehicle, whether it be a high performance engine or a stock manufacturer engine. Increasing the horsepower and torque of the engine of a vehicle are typical areas or concern when modifying a vehicle and there are a number of ways to do so. Some modifications made to increase the horsepower and torque of an engine include modifying the exhaust or adding or replacing parts within the engine bay, such as a turbo. However, many modifications that are made within the engine bay can be difficult due to the limited amount of space. The size of the engine bay often impacts the size of modifications that can be made and the in some cases prevents a modification from being carried out at all.

Therefore it is the object of the present invention to provide a volumetric expander that is installed in between the throttle body and the intake manifold of the engine. The present invention is designed to increase the air flow to the engine while fully using the amount of space within the engine bay. A throttle neck body having an intake tube that can be straight or angled depending on the available space within the engine bay, defines the amount by which the volume of air intake is increased. The throttle neck body is installed in place using a manifold adapter sized to fit the intake manifold and a throttle body adapter sized to receive the throttle body. The present invention can be designed as a single installation piece, or as a multiple piece installation kit. Furthermore, the present invention may be used in combination with a forced induction system, a nitrous oxide system, or a naturally aspirated engine.

DETAIL DESCRIPTIONS OF THE INVENTION

All illustrations of the drawings are for the purpose of describing selected versions of the present invention and are not intended to limit the scope of the present invention.

The present invention is a volumetric expander for an intake manifold of an engine. The present invention is installed between the intake manifold and the throttle body of the vehicle, wherein the present invention enlarges the plenum chamber of the intake manifold. In the preferred embodiment, the present invention is sized such that the volume of air received by the engine is the full air volume per liter for the engine. The present invention allows for the increased air flow into the intake manifold, despite the minimal available space within the engine bay.

Figure 1:
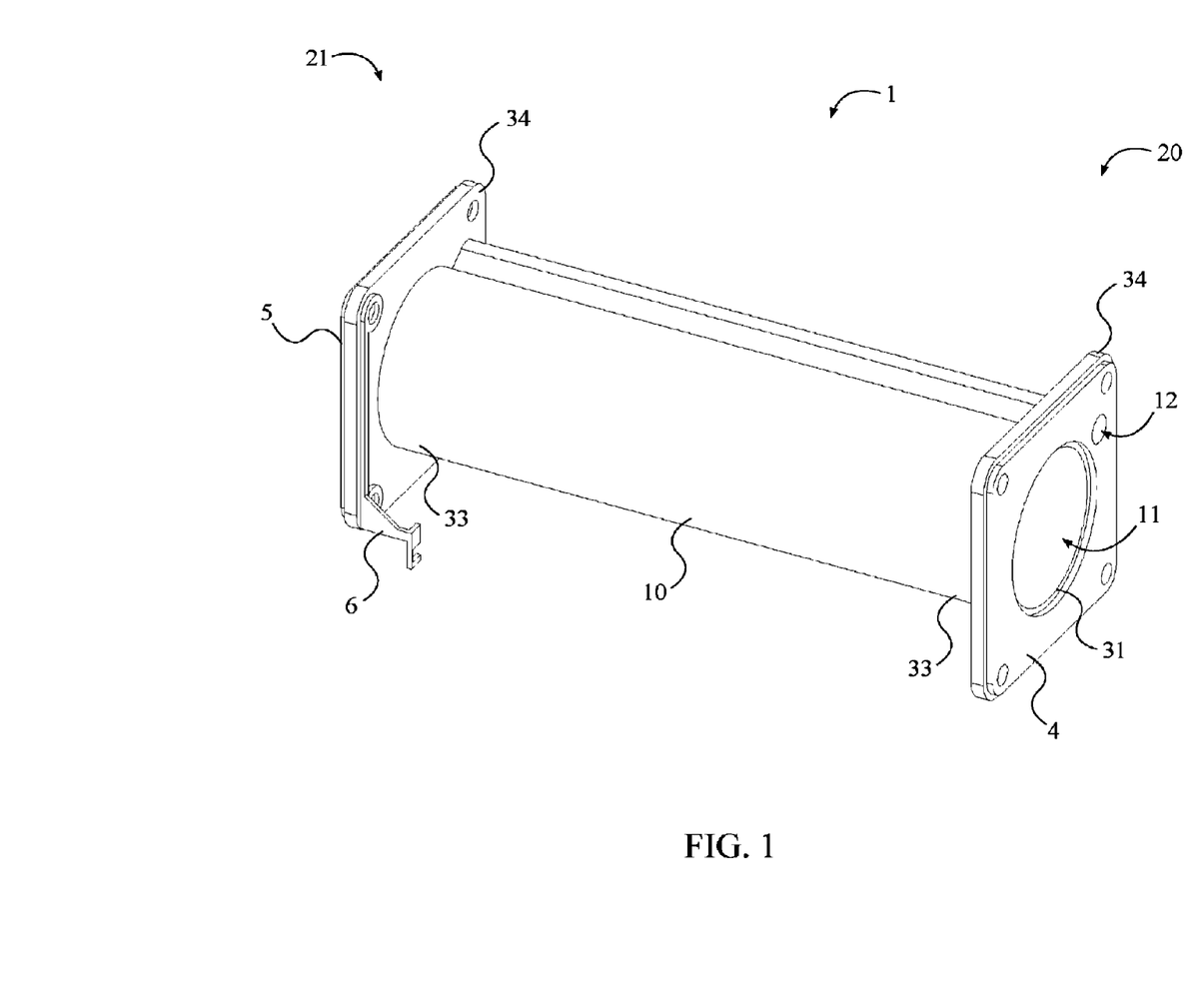
FIG. 1 is a perspective view of the present invention, wherein the adapter neck of the manifold adapter and the throttle body adapter is connected to the intake tube to form a single piece.

In reference to FIG. 1, the present invention comprises a throttle body neck 1, a manifold adapter 20, a throttle body adapter 21, a manifold gasket 4, a throttle body gasket 5, and a throttle body cable bracket 6. The throttle body neck 1 is the central component of the present invention and comprises a intake tube 10, a first air channel 11, and a second air channel 12. The intake tube 10 is a thin walled structure and provides the body of the throttle body neck 1. The intake tube 10 is positioned in between the throttle body and the intake manifold, wherein the volume of the plenum of the intake manifold is expanded correspondingly with the size of the intake tube 10. The intake tube 10 can be straight, angled, or curved depending on the embodiment of the present invention and the type or types of vehicle with which the present invention is designed to be used. For example, the engine bay of one vehicle may require the intake tube 10 being straight, while the engine bay of a second vehicle may require the intake tube 10 to be angled.

Figure 2:
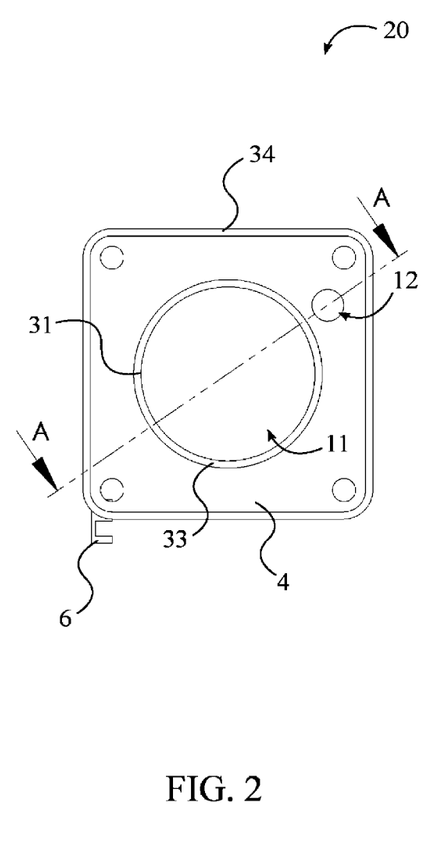
FIG. 2 is a right side elevational view of the present invention in the preferred embodiment, showing an sectional cut line.
Figure 3:
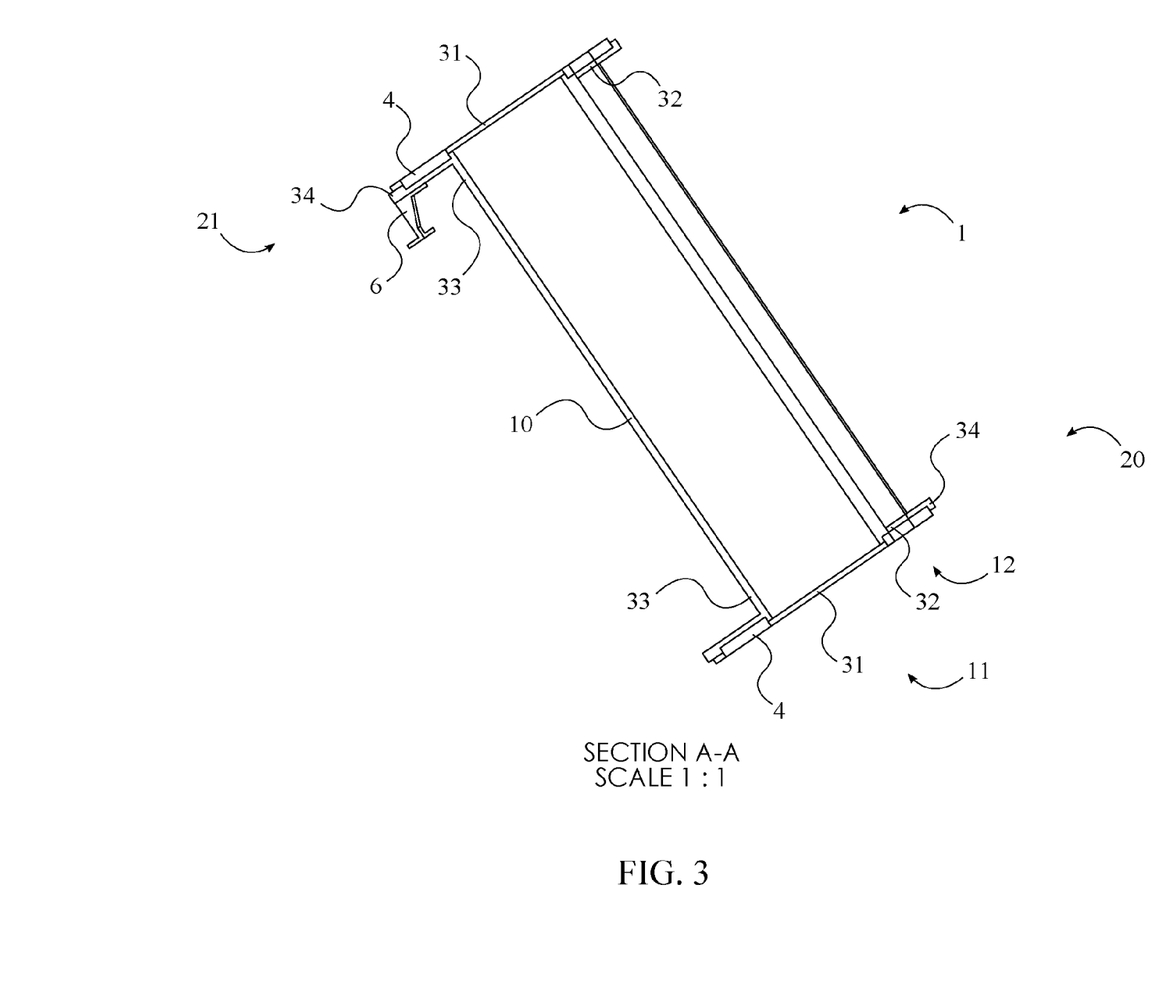
FIG. 3 is a sectional view about line A-A in FIG. 2, showing the first air channel and the second air channel traversing through the intake tube.

In reference to FIG. 2-3, the first air channel 11 and the second air channel 12 are positioned along the intake tube 10 and are used to deliver air from the engine bay of the vehicle to the intake manifold. The first air channel 11 directs air through the plenum chamber of the intake manifold, into the engine of the vehicle. The first air channel 11 traverses through the intake tube 10, providing the volume of space by which the plenum chamber is increased. Meanwhile, the second air channel 12 traverses through the intake tube 10 and directs air to the throttle position sensor (TPS) of the vehicle; the second air channel 12 being isolated from the first air channel 11.

In reference to FIG. 1, the manifold adapter 20 and the throttle body adapter 21 are positioned opposite each other along the intake tube 10, wherein the manifold adapter 20 and the throttle body adapter 21 are both terminally connected to the intake tube 10. The manifold adapter 20 provides a connection between the intake tube 10 and the intake manifold, while the throttle body provides a connection between the intake tube 10 and the throttle body. Each of the manifold adapter 20 and the throttle body adapter 21 comprises a first intake opening 31, a second intake opening 32, an adapter neck 33, and an end plate 34.

The adapter neck 33 is a thin walled structure through which the first intake opening 31 traverses. The adapter neck 33 of the manifold adapter 20 and the adapter neck 33 of the throttle body adapter 21 are both adjacently connected to the intake tube 10, such that the first air channel 11 is in fluid communication with the first intake opening 31 of the manifold adapter 20 and the first intake opening 31 of the throttle body adapter 21, as shown in FIG. 3. Meanwhile, the end plate 34 is perimetrically connected to the adapter neck 33; the end plate 34 being terminally positioned along the adapter neck 33. The second intake opening 32 traverses through the end plate 34, such that the second air channel 12 is in fluid communication with the second intake opening 32 of the manifold adapter 20 and the second intake opening 32 of the throttle body adapter 21, as shown in FIG. 3.

In reference to FIG. 1, in the preferred embodiment of the present invention, the intake tube 10 and the adapter neck 33 of both the manifold adapter 20 and the throttle body adapter 21 are seamlessly connected to form a single structure with a constant interior diameter. The intake tube 10 is adjacently connected to the adapter neck 33 of the manifold adapter 20 opposite the end plate 34 of the manifold adapter 20, and adjacently connected to the adapter neck 33 of the throttle body adapter 21 opposite the end plate 34 of the throttle body adapter 21. In this way, the end plate 34 of the manifold adapter 20 and the end plate 34 of the throttle body adapter 21 allow the present invention to be connected to the intake manifold and the throttle body, respectively.

Figure 6:
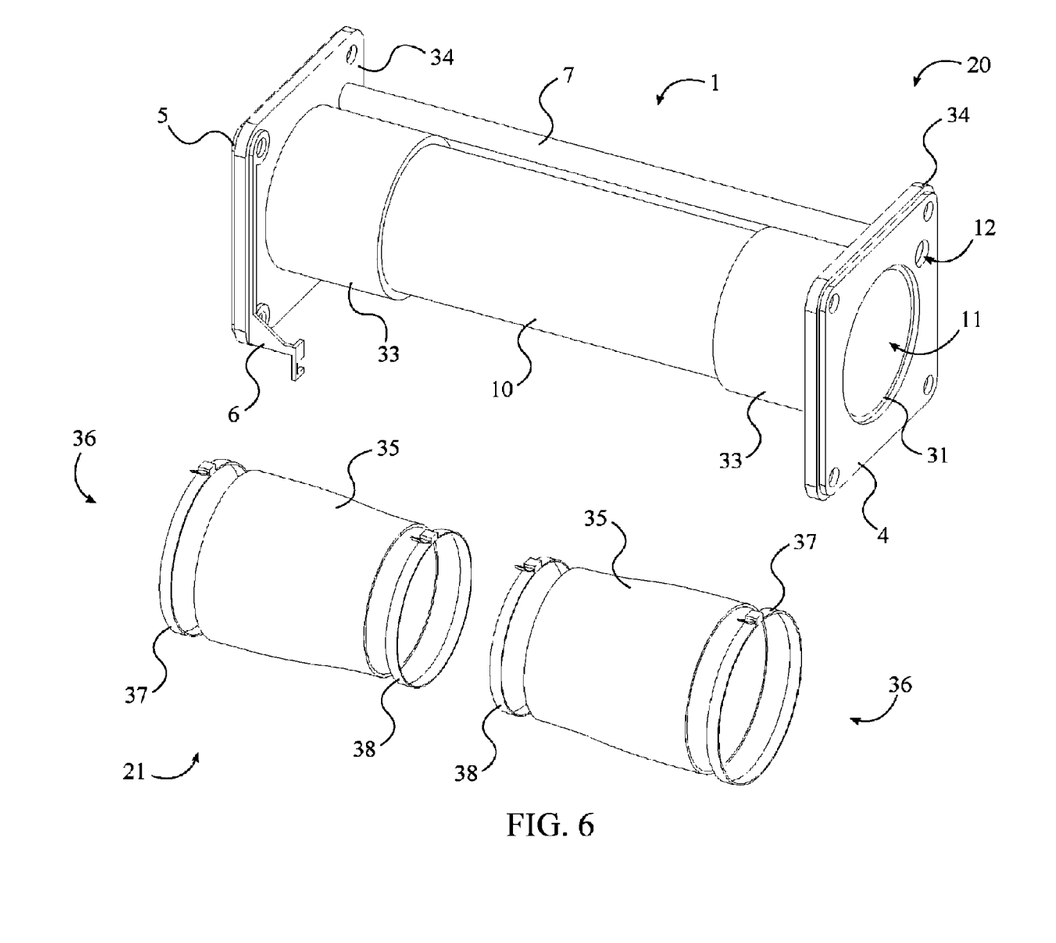
FIG. 6 is a perspective view thereof, wherein the sleeve is removed, showing the intake tube being positioned into the adapter neck.

In reference to FIG. 6, in an alternative embodiment of the present invention, the intake tube 10, the manifold adapter 20, and the throttle body adapter 21 are separate structures, such that the present invention can be provided as a self-assembled kit. As such, the intake tube 10 is positioned into the adapter neck 33 of the manifold adapter 20 opposite the end plate 34 of the manifold adapter 20. Similarly, the intake tube 10 is positioned into the adapter neck 33 of the throttle body adapter 21 opposite the end plate 34 of the throttle body adapter 21. In order to secure the adapter neck 33 of both the manifold adapter 20 and the throttle body adapter 21 to the intake tube 10, both the manifold adapter 20 and the throttle body adapter 21 further comprise a sleeve 35 and a plurality of clamps 36.

Figure 5:
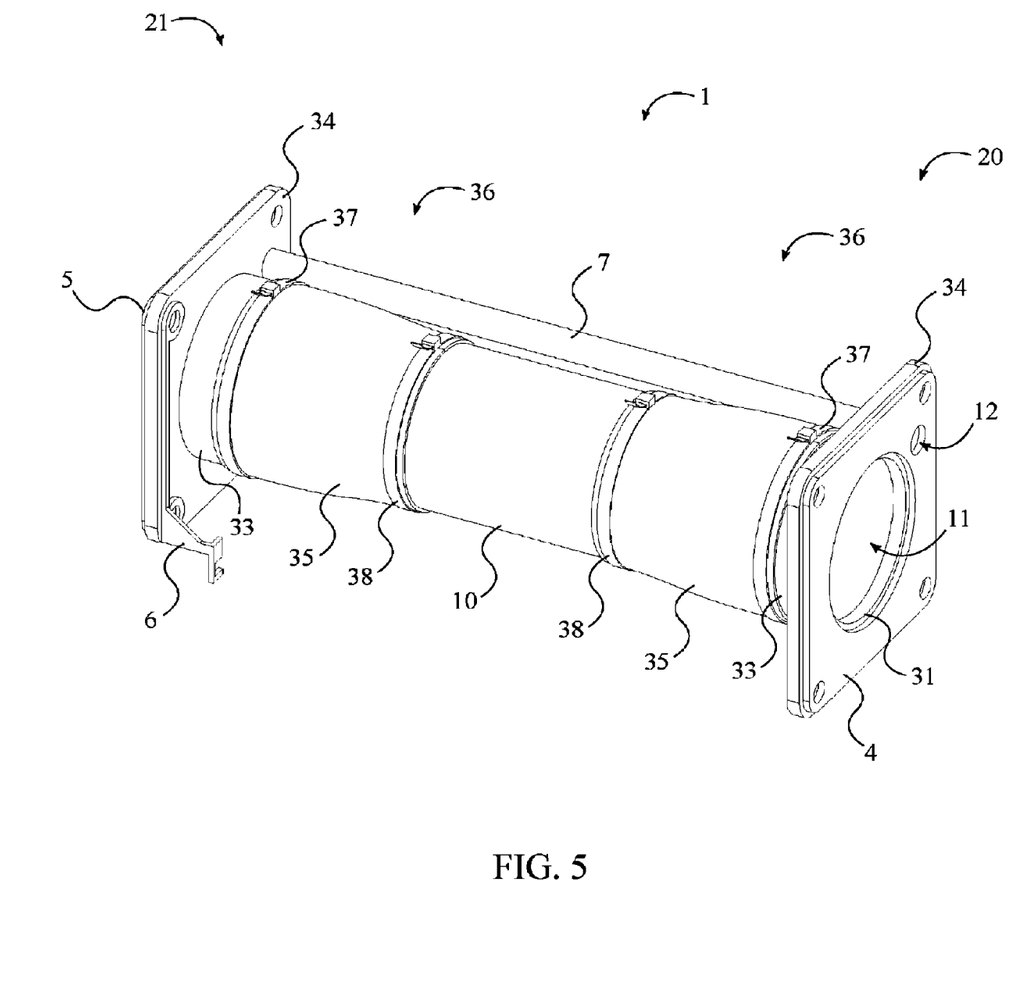
FIG. 5 is a perspective view of the present invention is the alternative embodiment, wherein the sleeve secures the adapter neck to the intake tube.

In reference to FIG. 5, the sleeve 35 of the manifold adapter 20 encompasses the adapter neck 33 of the manifold adapter 20 and the intake tube 10, while the sleeve 35 of the throttle body adapter 21 encompasses the adapter neck 33 of the throttle body adapter 21 and the intake tube 10. Preferably, the sleeve 35 is constructed from a silicone material, wherein the sleeve 35 is tightly wrapped around the adapter neck 33 and the intake tube 10. However, it is possible for other materials to be used for the sleeve 35 in different embodiments of the present invention. The plurality of clamps 36 is utilized to ensure the sleeve 35 is securely fitted around the adapter neck 33 and the intake tube 10. Preferably each of the plurality of clamps 36 is a hose clamp, however, it is possible for any similar device to be utilized.

In further reference to FIG. 5, each of the plurality of clamps 36 of the manifold adapter 20 is positioned around the sleeve 35 of the manifold adapter 20, while each of the plurality of clamps 36 of the throttle body adapter 21 is positioned around the sleeve 35 of the throttle body adapter 21. In one embodiment, the plurality of clamps 36 of both the manifold adapter 20 and the throttle body adapter 21 comprises a first clamp 37 and a second clamp 38. The first clamp 37 of the manifold adapter 20 is positioned adjacent to the end plate 34 of the manifold adapter 20, while the second clamp 38 of the manifold adapter 20 is positioned along the sleeve 35 of the manifold adapter 20 opposite the first clamp 37 of the manifold adapter 20. Similarly, the first clamp 37 of the throttle body adapter 21 is positioned adjacent to the end plate 34 of the throttle body adapter 21, while the second clamp 38 of the throttle body adapter 21 is positioned along the sleeve 35 of the throttle body adapter 21 opposite the first clamp 37 of the throttle body adapter 21.

Figure 7:
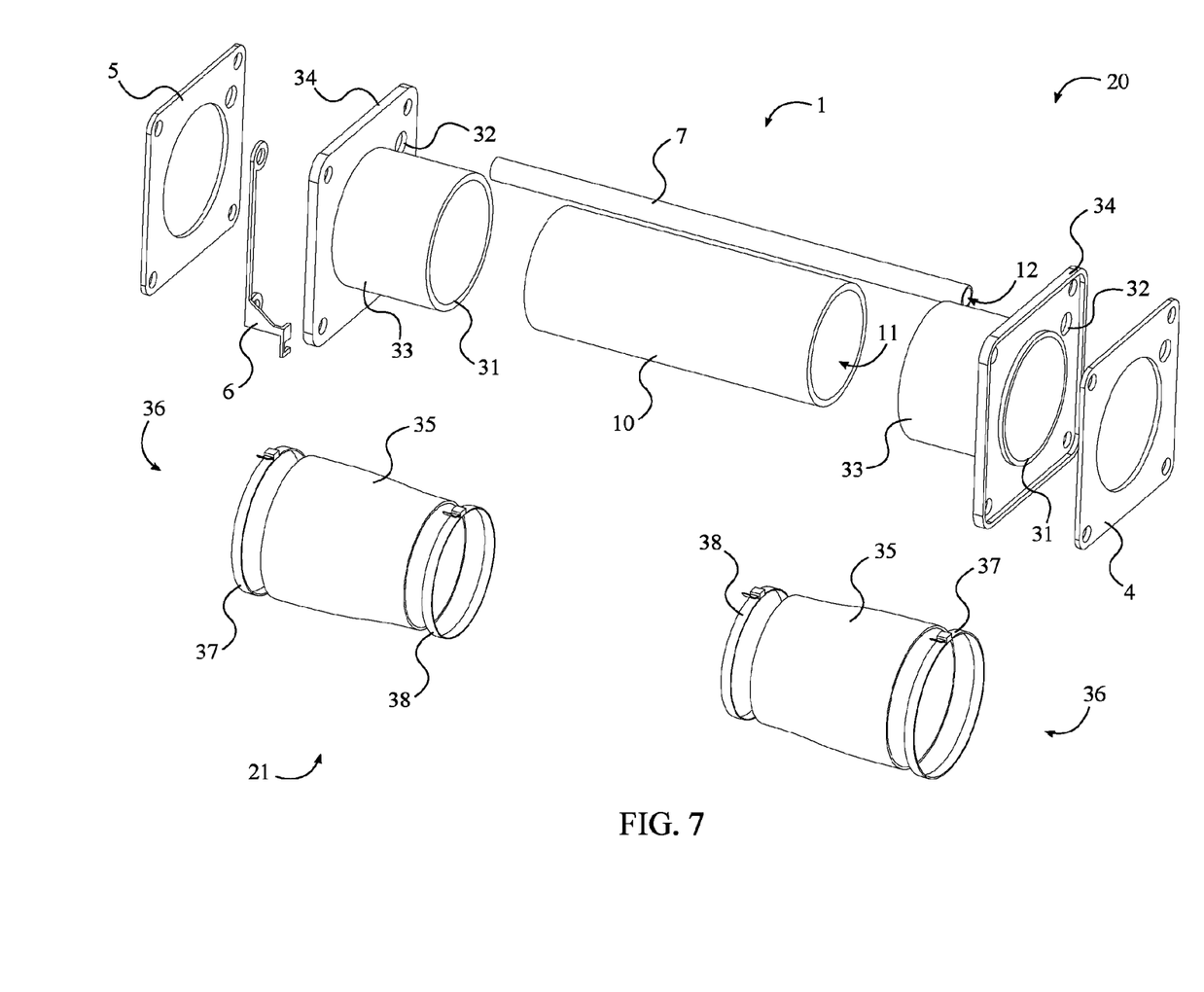
FIG. 7 is an exploded view of the present invention in the alternative embodiment.

In reference to FIG. 7, in the alternative embodiment of the present invention, the throttle body neck 1 further comprises an auxiliary intake tube 70. Instead of traversing through the intake tube 10, the second air channel 12 traverses through the auxiliary intake tube 70, wherein the auxiliary intake tube 70 is a flexible hose. The auxiliary intake tube 70 is positioned along the intake tube 10 and is terminally connected to the manifold adapter 20 and the throttle body adapter 21. More specifically, the auxiliary intake tube 70 is terminally connected to the end plate 34 of the manifold adapter 20 and the end plate 34 of the throttle body adapter 21. The auxiliary intake tube 70 forms a tight seal with the end plate 34 of both the manifold adapter 20 and the throttle body adapter 21 in order to prevent any leakage.

Figure 4:
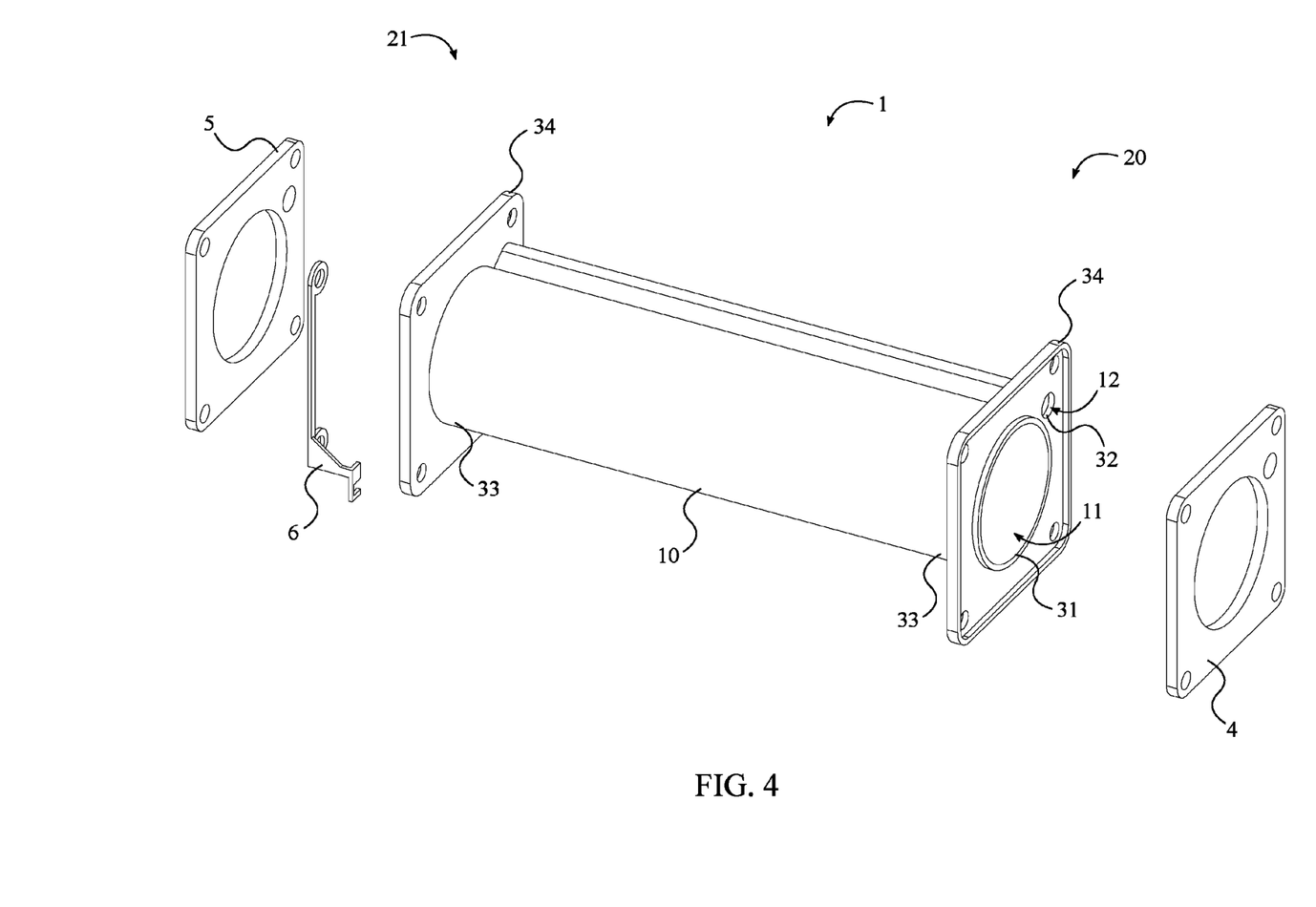
FIG. 4 is an exploded view of the present invention in the preferred embodiment.

In reference to FIG. 4, the manifold gasket 4 is provided to create a tight seal between the manifold adapter 20 and the intake manifold. As such, the manifold gasket 4 is positioned into the manifold adapter 20 opposite the intake tube 10, as depicted in FIG. 1, wherein the manifold gasket 4 fills the space between the manifold adapter 20 and the intake manifold when the manifold adapter 20 is connected to the intake manifold. More specifically, the manifold gasket 4 is positioned into the end plate 34 of the manifold adapter 20, wherein the cross section of the manifold gasket 4 mirrors the cross section of the end plate 34 of the manifold adapter 20.

The manifold adapter 20 is connected to the intake manifold using a plurality of manifold bolts. Each of the plurality of manifold bolts is positioned through the manifold adapter 20 into the intake manifold, wherein each of the manifold bolts is threaded into the intake manifold. More specifically, each of the plurality of manifold bolts traverses through the end plate 34 of the manifold adapter 20. In the preferred embodiment of the present invention, the plurality of manifold bolts is specifically four bolts, wherein a corresponding number of holes is provided through the end plate 34 of the manifold adapter 20 and the manifold gasket 4.

Similar to the manifold gasket 4 and in reference to FIG. 4, the throttle body gasket 5 is provided to create a tight seal between the throttle body adapter 21 and the throttle body. As such, the throttle body gasket 5 is positioned into the throttle body adapter 21 opposite the intake tube 10, wherein the throttle body gasket 5 fills the space between the throttle body adapter 21 and the throttle body when the throttle body adapter 21 is connected to the throttle body. More specifically, the throttle body gasket 5 is positioned into the end plate 34 of the throttle body adapter 21, wherein the cross section of the throttle body gasket 5 mirrors the cross section of the end plate 34 of the throttle body adapter 21.

The throttle body adapter 21 is connected to the throttle body using a plurality of throttle body bolts. Each of the plurality of throttle body bolts is positioned through both the throttle body adapter 21 and the throttle body. More specifically, each of the plurality of throttle body bolts traverses through the end plate 34 of the throttle body adapter 21. A nut is threaded onto each of the plurality of throttle body bolts in order to secure the throttle body to the throttle body adapter 21. In the preferred embodiment of the present invention, the plurality of throttle body bolts is specifically four bolts, wherein a corresponding number of holes is provided through the end plate 34 of the throttle body adapter 21 and the throttle body gasket 5.

In reference to FIG. 1, the throttle body cable bracket 6 is utilized to support the throttle body cable, such that the throttle body cable remains in position along the intake tube 10. The throttle body cable bracket 6 is positioned adjacent to the throttle body adapter 21, such that the throttle body cable is supported near the throttle body. The throttle body cable bracket 6 can be mounted differently depending on the embodiment of the present invention, and the specific type or types of vehicle with which the present invention is designed to be used. In one embodiment of the present invention, the throttle body cable bracket 6 is adjacently connected to the intake tube 10. In another embodiment of the present invention, the throttle body cable bracket 6 is adjacently connected to the throttle body adapter 21.

In order to properly engage the present invention with an engine, a user must remove the throttle body from the intake manifold. The manifold adapter 20 is then positioned adjacent to the intake manifold, such that the holes of the manifold adapter 20 and the manifold gasket 4 are aligned with the holes in the intake manifold. The plurality of manifold bolts is then inserted through the manifold adapter 20 and into the intake manifold in order to secure the manifold adapter 20 to the intake manifold. The throttle body is then positioned adjacent to the throttle body adapter 21, such that the holes in the throttle body are aligned with the holes in the throttle body gasket 5 and the throttle body adapter 21. The plurality of throttle body bolts is then inserted through the throttle body and the throttle body adapter 21, and a nut is secured to each of the plurality of throttle body bolts.

Although the invention has been explained in relation to its preferred embodiment, it is to be understood that many other possible modifications and variations can be made without departing from the spirit and scope of the invention as hereinafter claimed.

What is claimed is:

1. A volumetric expander for an intake manifold comprises:
   a throttle body neck comprising an intake tube, a first air channel, and a second air channel;
   the first air channel and the second air channel being positioned along the intake tube;
   the first air channel traversing through the intake tube;
   a manifold adapter and a throttle body adapter each comprising a first intake opening and a second intake opening;
   the manifold adapter and the throttle body adapter being positioned opposite each other along the intake tube;
   the first air channel being in fluid communication with the first intake opening of the manifold adapter and the first intake opening of the throttle body adapter; and
   the second air channel being in fluid communication with the second intake opening of the manifold adapter and the second intake opening of the throttle body adapter.

2. The volumetric expander for an intake manifold as claimed in claim 1 comprises:
   the manifold adapter and the throttle body adapter being terminally connected to the intake tube.

3. The volumetric expander for an intake manifold as claimed in claim 2 comprises:
   the manifold adapter comprising an adapter neck and an end plate;
   the end plate being terminally positioned along the adapter neck; and
   the intake tube being adjacently connected to the adapter neck opposite the end plate.

4. The volumetric expander for an intake manifold as claimed in claim 2 comprises:
   the throttle body adapter comprising an adapter neck and an end plate;
   the end plate being terminally positioned along the adapter neck; and
   the intake tube being adjacently connected to the adapter neck opposite the end plate.

5. The volumetric expander for an intake manifold as claimed in claim 1 comprises:
   the manifold adapter comprising an adapter neck and an end plate;
   the end plate being terminally positioned along the adapter neck; and
   the intake tube being positioned into the adapter neck opposite the end plate.

6. The volumetric expander for an intake manifold as claimed in claim 5 comprises:
   the manifold adapter further comprising a sleeve and a plurality of clamps;
   the sleeve encompassing the adapter neck and the intake tube; and
   each of the plurality of clamps being positioned around the sleeve.

7. The volumetric expander for an intake manifold as claimed in claim 6 comprises:
   the plurality of clamps comprising a first clamp and a second clamp;
   the first clamp being positioned adjacent to the end plate; and
   the second clamp being positioned along the sleeve opposite the first clamp.

8. The volumetric expander for an intake manifold as claimed in claim 1 comprises:
   the throttle body adapter comprising an adapter neck and an end plate;
   the end plate being terminally positioned along the adapter neck; and
   the intake tube being positioned into the adapter neck opposite the end plate.

9. The volumetric expander for an intake manifold as claimed in claim 8 comprises:
   the throttle body adapter further comprising a sleeve and a plurality of clamps;
   the sleeve encompassing the adapter neck and the intake tube; and
   each of the plurality of clamps being positioned around the sleeve.

10. The volumetric expander for an intake manifold as claimed in claim 9 comprises:
    the plurality of clamps comprising a first clamp and a second clamp;
    the first clamp being positioned adjacent to the end plate; and
    the second clamp being positioned along the sleeve opposite the first clamp.

11. The volumetric expander for an intake manifold as claimed in claim 1 comprises:
    a manifold gasket; and
    the manifold gasket being positioned into the manifold adapter opposite the intake tube.

12. The volumetric expander for an intake manifold as claimed in claim 1 comprises:
    a throttle body gasket; and
    the throttle body gasket being positioned into the throttle body adapter opposite the intake tube.

13. The volumetric expander for an intake manifold as claimed in claim 1 comprises:
    the second air channel traversing through the intake tube.

14. The volumetric expander for an intake manifold as claimed in claim 1 comprises:

the throttle body neck further comprising an auxiliary intake tube;

the second air channel traversing through the auxiliary intake tube; and the auxiliary intake tube being terminally connected to the manifold adapter and the throttle body adapter.

15. The volumetric expander for an intake manifold as claimed in claim 1 comprises:

a throttle body cable bracket; and the throttle body cable bracket being positioned adjacent to the throttle body adapter.

16. The volumetric expander for an intake manifold as claimed in claim 15 comprises:

the throttle body cable bracket being adjacently connected to the throttle body adapter.

\* \* \* \* \*